United States Patent [19]
Pritchard et al.

[11] Patent Number: 5,014,126
[45] Date of Patent: May 7, 1991

[54] METHOD AND APPARATUS FOR RECORDING IMAGES WITH A SINGLE IMAGE RECEIVER FOR AUTOSTEREOSCOPIC DISPLAY

[75] Inventors: Eric K. Pritchard, Berkley Springs, W. Va.; Christopher A. Mayhew, McLean, Va.

[73] Assignee: Vision III Imaging, Inc., McLean, Va.

[21] Appl. No.: 425,232

[22] Filed: Oct. 23, 1989

[51] Int. Cl.⁵ .......................................... H04N 13/00
[52] U.S. Cl. ...................................... 358/91; 358/92
[58] Field of Search .................. 358/88, 89, 91, 92, 358/3, 90, 2; 350/130, 131, 144; 352/62

[56] References Cited

U.S. PATENT DOCUMENTS

| | | |
|---|---|---|
| 904,212 | 10/1908 | Moran . |
| 1,259,365 | 3/1918 | Cooper . |
| 1,477,541 | 12/1923 | Clement et al. . |
| 2,002,090 | 5/1935 | Ives . |
| 2,158,660 | 5/1939 | Kanolt . |
| 2,460,864 | 2/1949 | Whiteley . |
| 2,508,487 | 5/1950 | Bonnet ............................ 352/62 X |
| 2,933,008 | 4/1960 | Barnett . |
| 3,019,698 | 2/1962 | Sheldon . |
| 3,418,044 | 12/1968 | Sheldon . |
| 3,598,032 | 8/1971 | Bohn et al. ....................... 358/92 X |
| 3,608,457 | 9/1971 | Barker . |
| 4,006,291 | 2/1977 | Imsand . |
| 4,062,045 | 12/1977 | Iwane . |
| 4,303,316 | 1/1981 | McElveen . |
| 4,420,230 | 12/1983 | McElveen . |
| 4,429,328 | 1/1984 | Jones, Jr. et al. . |
| 4,528,587 | 7/1985 | Jones, Jr. . |
| 4,567,513 | 1/1986 | Imsand . |
| 4,714,319 | 12/1987 | Zeevi et al. ....................... 358/89 X |
| 4,815,819 | 3/1989 | Mayhew et al. . |

FOREIGN PATENT DOCUMENTS 0037993 3/1982 Japan ..................................... 358/88

OTHER PUBLICATIONS

Linback, pp. 139-182.
Okoshi (I) "Three-Dimensional Displays", *Proceedings of the IEEE*, vol. 68, No. 5, 5/1980, pp. 548-564.
Julesz (I), "Foundations of Cyclopean Perception," The University of Chicago Press; ©1971, (various pages).
Julesz (II); "Cooperative Phenomena in Binocular Depth Perception," *American Scientist;* Jan.-Feb. '74; pp. 32-43.
"The Focal Encyclopedia of Film and Television Techniques" Hastings House Pub. (various pages).

*Primary Examiner*—Victor R Kostak
*Attorney, Agent, or Firm*—Barnes & Thornburg

[57] ABSTRACT

The method and apparatus substantially continuously changes the view of a single image receive substantially aligned to a convergent point in a scene, along a scanning path and recording a plurality of scanning images for each cycle of traversing the scanning path. The scanning path and the scanning and recording rates are selected to produce motion within visio-psychological memory rate range when displayed using standard display devices.

42 Claims, 5 Drawing Sheets

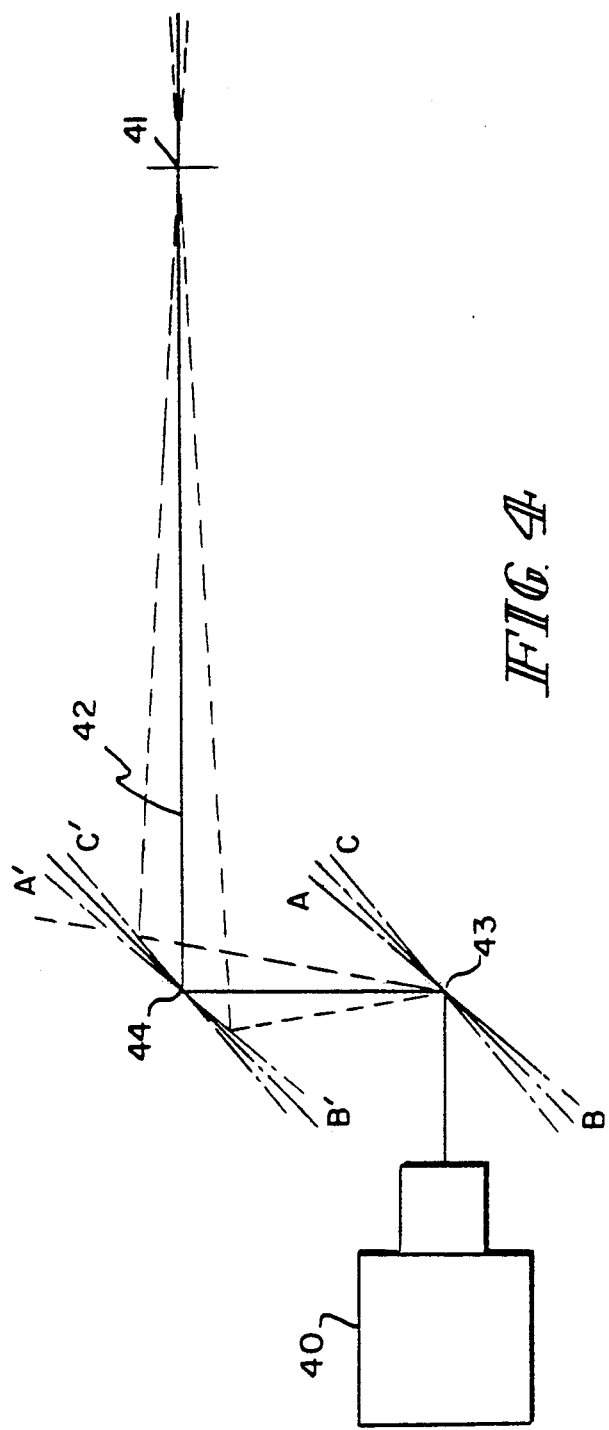

METHOD AND APPARATUS FOR RECORDING IMAGES WITH A SINGLE IMAGE RECEIVER FOR AUTOSTEREOSCOPIC DISPLAY

BACKGROUND AND SUMMARY OF THE INVENTION

The present invention relates to apparatus and methods for recording a three-dimensional illusion and more specifically for recording images for truly autostereoscopic display.

Production of two-dimensional images which may be used to provide a "true" three-dimensional illusion is a long outstanding goal in the visual arts field. The term "three-dimensional" has been expanded over the last several years by the computer imaging industry to include images produced using depth cues that take advantage of perspective, shading, reflections, and motion. Although, these images can be rendered with incredible results, they are nevertheless two-dimensional. A "true" three-dimensional image contains parallax information in addition to other two-dimensional depth cues.

Nature has given humans binocular vision, endowing them with two eyes which look in the same direction and whose visual fields overlap. Each of the eyes views the scene from a slightly different angle. The scene viewed is focused by the eye's lens on the retina. The retina is a concave surface at the back of the eye, lined with nerve cells, or nuerons. Since the surfaces of the retina are concave, the two images focused by the eye's are two-dimensional. Both two-dimensional images are transmitted by electrical impulses along the optic nerve to the brain's visual cortex. It is in the visual cortex that the two images are combined (fused), through stereopsis, to form a cyclopean view of the scene being observed by the two eyes. The brain is thought of as having a one-eyed or cyclopean eyed view of the world. That is to say, the ability to determine direction and see in three-dimensions, is something the individual eyes can not accomplish alone.

There is some question as to whether this cyclopean view is created by simultaneous processing of left and right views or a replacement phenomena in which a short-term memory buffer is used by the brain to compare left and right views.

Not all people with binocular vision can perceive three-dimensional images. From 2 to 10 percent of the population may fail to experience stereopsis in their day-to-day lives. Another 10 percent may achieve only limited stereopsis. It has been shown that stereoscopic vision differs greatly among individual people and that some practice is involved.

It has been observed that left and right eye information can be presented alternately to the left and right eyes, resulting in depth perception as long as the time interval does not exceed 100 ms. More recently, it has been demonstrated that stereoscopic information can be perceived by one eye if presented in the proper manner and it is possible for the brain to process and accept alternating parallax information, without regard to the direction of the parallax, from both eyes using a standard television screen.

Although humans are anatomically and psychologically capable of viewing the world around them in three-dimensions, they do not have the natural ability for depth perception on a two-dimensional screen, such as those used in motion pictures or television. The depth perceived on a two-dimensional screen is read into the image by viewers through a learned process based on their cultural and sociological backgrounds.

A great deal of effort has been devoted to developing three-dimensional display hardware. The two main categories for display hardware are, stereoscopic and autostereoscopic. Stereoscopic techniques require the viewer to wear some sort of apparatus to force each of the viewer's eyes to see a different perspective of the image. This group includes stereoscopes, polarization, anaglyphic, chromo-stereoscopic, Pulfrich, and shuttering technologies. Autostereoscopic displays do not require viewing devices. Autostereoscopic display, including, among others, holography, lenticular screens, parallax barriers, and alternating pairs do not require the viewer to wear devices, but do require optical modifying display devices. True autostereoscopic display require no special display device. The development of autostereoscopic methods and techniques has to some extent paralleled development in the field of physiology of depth perception.

An example of a typical true autostereoscopic approach using horizontally displaced points of origin is described in U.S. Pat. No. 4,006,291 issued to Imsand in which images from one point of origin are primarily used while images from another point of origin are periodically inserted. Examples of non-horizontal systems are disclosed in U.S. Pat. No. 4,420,230 issued to McElveen, in which left and right images are diagonally separated and alternately displayed on a viewing surface at a rate determined by the distance to the nearest non-moving object. U.S. Pat. No. 4,429,328 issued to Jones, Jr., et al., shows a method for creating a three-dimensional effect by alternately displaying images from a pair of vertically displaced points of origin at a rate of 4 to 30 changes per second.

A principle drawback of alternating images from two viewing points, whether using horizontal, diagonal or vertical displacement approaches, is that slow moving or stationary objects in the scene being viewed tend to move or rock as the point of origin alternates. This image instability (rocking) phenomenon is attributable to the different viewing angles corresponding to the respective points of origin.

Image instability is the main reason why none of the above mentioned patents has been used or demonstrated commercially. Jones, Jr., attempted to control the rocking motion in U.S. Pat. No. 4,567,513 by adding a video mixing device, which intermittently superimposed the second point of origin onto the first point of origin at a rate of 4 to 30 times a second, rather than alternating images as before. This did little to control rocking and resulted in intermittent image softening.

The present inventors disclosed in U.S. Pat. No. 4,815,819 methods and apparatus for displaying a stable three-dimensional illusion. This approach relies on discrete motion between the various depth planes in a given scene. The motion is accomplished by two cameras (only one is need for stop-motion) critically aligned and manipulated throughout the entire filming or taping of a scene. By alternating the camera's images at a rate of between 1 to 60 changes per second and constantly keeping the discrete motion in balance, the resulting display is perceived by the viewer as having depth without a rocking motion.

While the U.S. Pat. No. 4,815,819 methods produce a stable three-dimensional illusion, they still require two cameras (two points of origin). A two camera system requires careful camera alignment to eliminate unwanted movement in all depth planes, precision matching of chrominance and luminance, accurate matching of camera tube scannings, and matching of lenses in focal length. Two camera systems tend to be large and heavy because of the additional optical elements in the folded optical path and the mount which is used to manipulate the cameras. Further, the optical path significantly reduces the light going to the cameras and prohibits short focal length lenses. Zoom and anamorphic lenses are more difficult to adapt to a two camera system. Zoom lenses require precision matching and tracking throughout their entire focal and zoom ranges. Exposure and focus changes are problem because of mechanical "slop" differences in the two lenses.

Therefore, it is an object of the present invention to provide a method for recording and creating a three-dimensional illusion using a single image receiver, be it real or simulated by computer or motion control. The use of a single image receiver removes all of the matching problems associated with a two camera method and practically allows the use of varifocal length (zoom) lens.

A further object of this invention is a method of blurring the background to enhance image stability without blurring the foreground.

Another object to this invention is a method of changing the view of the image receiver at a rate which is not closely related to the image recording rate.

Still another object of this invention is to provide apparatus for moving the image receiver or for manipulating the optical axis to simulate a moving image receiver.

A further object of this invention is to provide an additional depth cue by blurring the background.

Still another object of the invention is to provide a method of recording images for true autostereoscopic display with stable images.

The method and apparatus includes substantially continuously changing the view of a single image receiver substantially aligned to a convergent point in a scene along a scanning path and recording a plurality of scanning images for each cycle of traversing the scanning path. The optical length of views along the scanning path to the convergence point is substantially constant to maintain an object at the convergence point substantially motionless during recording of the plural scanning images. The scanning path is sufficiently short and the scanning rate is sufficient to produce motion, when displayed, which is within visio-psychological memory rate range. The scanning path may be an arc equidistant and centered on the convergence point and the image receiver is moved along rails tangent to the arc. The scanning path can also be an line segment sufficiently short such that all points along the line segment are substantially equidistant from the convergence point. For the line segment path, the image receiver is rotated simultaneous with moving along the scanning path for maintaining the objects at the convergence point substantially motionless.

The single image receiver and the scene may be moved relative to each other along the scanning path by: (A) moving the image receiver along the scanning path; (B) moving objects in the scene relative to the image receiver or (C) optically manipulating the optical path between the image receiver and the scene. In any of these methods of moving the single image receiver and the scene relative to each other, the frequency of recording the scanning image is independent of the rate of movement along the scanning path. The exposure time of the image receiver is set sufficiently along to produce the blurring of the objects in the scene not at the convergence point to enhance the effect. The scanning path and convergence point are variable.

As an alternative, the same effect may be achieved by producing a plurality of images in a fixed medium from different views along the scanning path and optically recording the fixed mediums. As another alternative, a computer is used to generate a plurality of images at the various points of view along the scanning path and storing them for ultimate display.

The apparatus for performing the method includes a single image receiver and a scanning apparatus for moving the optical axis of the image receiver and a scene relative to each other along a scanning path while maintaining the image receiver's optical axis substantially on a convergence point in the scene. A control is provided for actuating the image receiver to record a plurality of scanning images, greater than 2, for each cycle of traversing of the scanning path so as to have a scanning motion. The scanning apparatus defines the scanning path as an arc or a short line segment. If a short line segment defines the scanning path, the recorder is rotated simultaneously with movement along the scanning path. The scanning apparatus may include a carriage mounted to a pair of rails which moves the image receiver along the scanning path or moves objects in the scene relative to a fix image receiver. Also the scanning apparatus may optically manipulate the optical path to produce the scanning motion. The actuating device actuates the image receiver for exposure time sufficiently long to produce a blurring of the objects in the scene not at the convergence point. The actuating device activates the image receiver at a frequency independent of the rate of the scanning. The rate of movement is adjustable. The actuation frequency and the rate of movement of the scanning apparatus produce a motion of objects in the scene, when viewed, within the visio-psychological memory rate range. The scanning apparatus has the ability of changing the convergence point as well as the scanning path.

Other objects, advantages and novel features of the present invention will become apparent from the following detailed description of the invention when considered in conjunction with the accompanying drawings.

BRIEF DESCRIPTION OF THE DRAWINGS

FIG. 4 is a schematic view of scanning apparatus for scanning by optical path manipulation with a fixed image receiver.

DETAILED DESCRIPTION OF THE DRAWINGS

Figure 1:
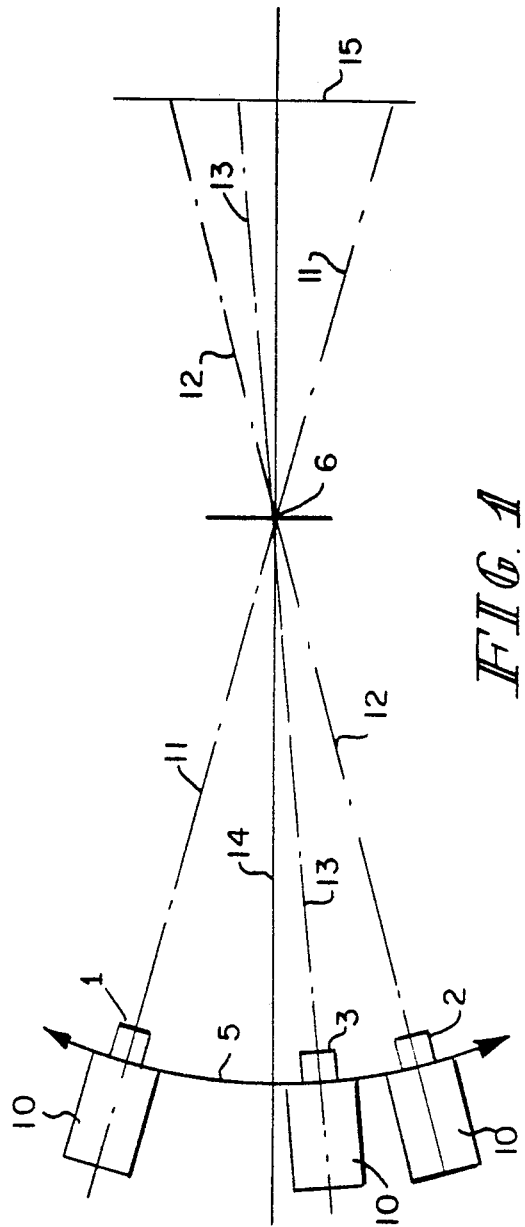
FIG. 1 is a view of the image scanning according to the principles of the present invention.

FIG. 1 illustrates the scanning geometry which produces the three-dimensional illusion. This figure shows a single image receiver 10 at three instantaneous views in the scanning path. Views 1 and 2 are at the ends of the scanning path while view 3 is at some intermediate position in the scanning path. These views lie along an arc 5 centered on a convergence point 6 and viewer axis 14 which represents the closest subject to the image receiver 10 per U.S. Pat. No. 4,815,819. The views 1, 2, and 3 have optical paths 11, 12, and 13 which all pass through the convergence point 6 and extend to the background 15. Thus as the image receiver 10 scans or traverses through the scanning path or arc 5, the object at the convergence point will be substantially motionless and have only a slight rotational motion while the background will be having a scanning motion.

Also as described in U.S. Pat. No. 4,815,819, which incorporated herein by reference, the focal point of the image receiver 10 is preferably in the background plane 15.

FIG. 1 exaggerates the angle between the extreme views 1 and 2. In practice this angle will be approximately one milliradian. Further, the arc segment 5 is then vary close to a straight line and may be approximated as a straight line if suitable means are employed keeping the image receiver 10 directed at the convergence point. The image receiver 10 should be rotated simultaneously with its movement along the path 5 for the reasons explained in U.S. Pat. No. 4,815,819.

The extent of the scanning along the arc segment 5 is a function of the distance from the image receiver to the convergence point as well as other motions in the scene and other image receiver or camera motions.

Figure 2:
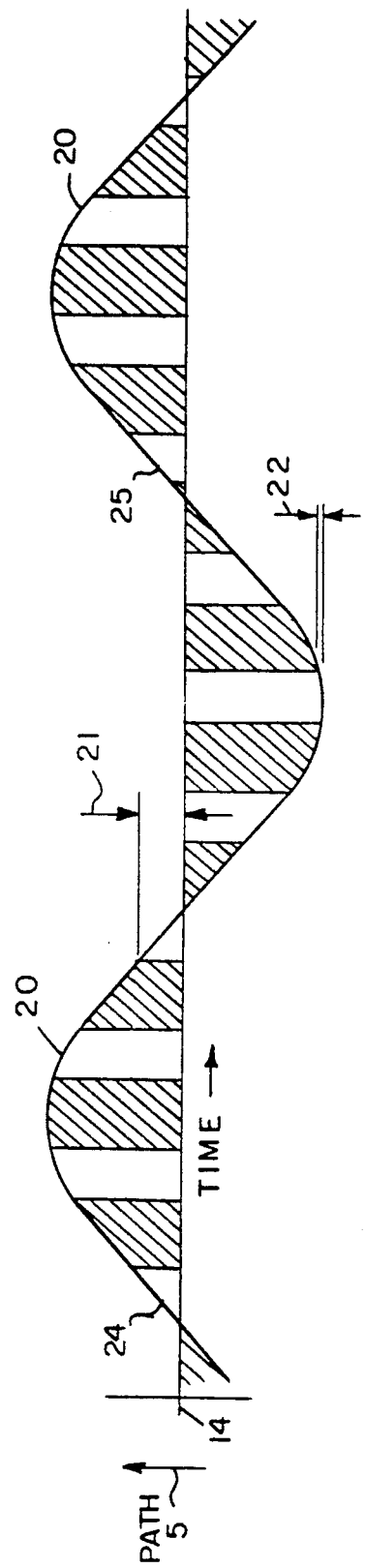
FIG. 2 is a graph of the scanning path with respect to a viewers axis verses time showing exposure regions.

FIG. 2 is a graph of the scanning path about the viewer's axis 14 verses time showing the active image reception or open shutter in the clear areas and the closed shutter in the shaded areas. A view will be considered the length of time the shutter is open or the resulting recorder scanning image. The image receiver 10 continuous moves along the scanning path 5 in an approximate sinusoidal motion as shown by curve 20 with zero velocity of the ends of the scanning path 5. Thus, the image receiver 10 moves different amounts 21 and 22 for different views in the scanning path. These motions blur the background and provide an additional depth cue while obscuring the scanning motion to enhance the apparent stability of the resulting recorded image. The prior art uses two cameras in fixed positions and alternates between the resulting sharp images at these two extreme positions. If the enhance effect of blurring is not desired and the equipment is available, the views along the scanning path can be substantially instantaneously recorded as if in stop motion.

FIG. 2 also shows that the exposure cycle is not necessarily related to the scanning cycle. Notice, the exposure 24 at the beginning of the first scanning cycle is not quite at the same position as the exposure 25 near the beginning of the second scan cycle. This asynchronous relationship further stabilizes the resulting recorded image. It may, however for special effects, be necessary to synchronize the scan rate with the exposure rate. Furthermore, the rate of the scan may be altered continuously or randomly to further stabilize the recorded image so long as the motion of objects in the scene when displayed remain in the visio-psychological memory rate.

The scanning rates are similar to the image changing cycle rates established for stereoscopic viewing in prior art, i.e. approximately 2 to 15 cycles per second. However, the image change rates are equal to the image change rate of the medium; 24 for standard motion picture film, so for PAL video and 60 for NTSC video such that the recorded scanning images can be true autostereoscoptically displayed using standard display equipment. Thus, to produce a viewed image change rate of 8 cycles per second to be displayed by a standard motion picture camera at 24 cycles per second, requires three images to be recorded per scanning cycles.

The scanning path 5 is substantially vertical since vertical parallax produces the appearance of depth while being more ameanable are comfortable to the viewer. The present method is not restricted to only vertical paths. Path 5 preferably includes a vertical component and may include vertical as well as horizontal components. Although it is not necessarily preferred, it is within the scope of the present invention that scanning path 5 maybe totally horizontal.

Figure 8:
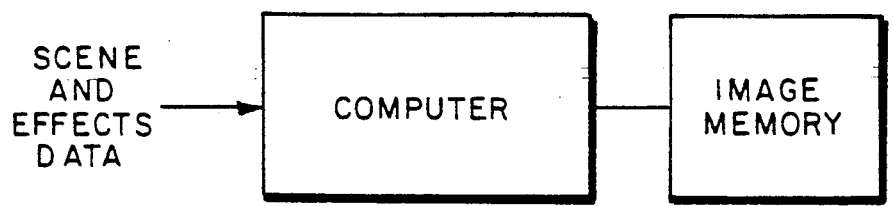
FIG. 8 is a block diagram of a system for computer generated images.

It should also be noted that FIG. 1 is a schematical representation of the method of the present invention and that the various scanning views of the scene along the path 5 may be produced by many different methods. For example, the relative motion between the scene and the image receiver 10 may be produced by moving the image receiver 10 along the path 5 as will be explained with respect to FIGS. 3, 6a and 6b. Alternatively, the optical path between the image receiver and the scene may be optically manipulated to provide the different views along the scanning path as illustrated in FIG. 4. As a further alternative illustrated in FIG. 5, the image receiver may be fixed and the objects in the scene may be moved to produce the appropriate views along the scanning path. Another further alternative, is to use computer generated scenes at the various view along the scanning path and storing these electronically, as illustrated in FIG. 8. As a final, although not inclusive alternative, individual views of the scenes along the scanning path may be created and produced in a fixed medium and the fixed medium views recorded in a scanning sequence.

Figure 3:
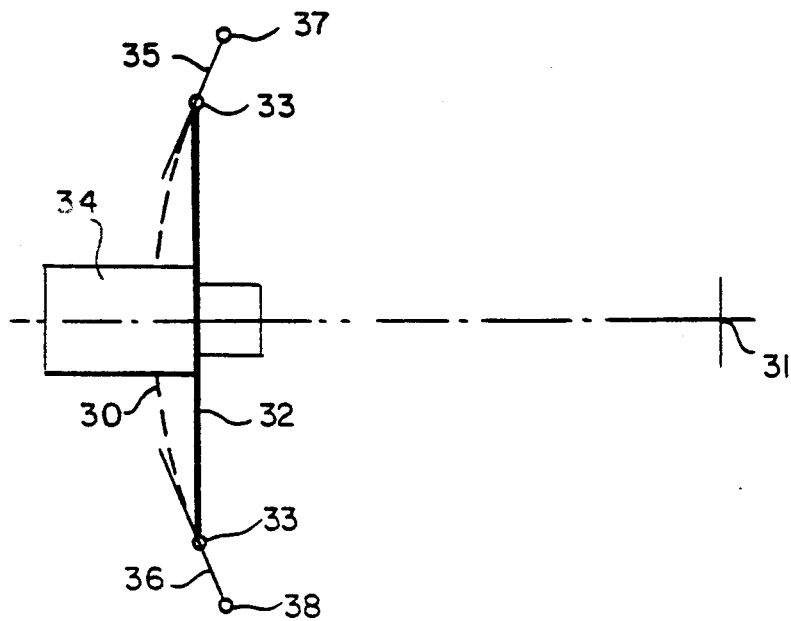
FIG. 3 is a schematic view of a preferred scanning structure.

FIG. 3 shows the preferred scanning apparatus for moving an image receiver 34 relative to a scene. Dashed curve 30 is the scanning arc about convergence point 31. Heavy line 32 represents a mounting plate which moves along arc 30 via bearings 33 and supports image receiver 34. This assembly is driven by a motor (not shown) to provide the approximate sinusoidal motion as depicted in FIG. 2. Travelling along a single arc reduces the usefulness to a single convergence distance. The rails 35 and 36 are designed tangent to the desired arc at bearings 33. Furthermore these rails can be pivoted about shafts 37 and 38 to approximate a wide range of arcs which center on convergence points at varying distances from the image receiver. Thus, as long as the motion is small, the image receiver 34 will travel in an approximate arc about convergence point 31. This approximation is quite good since the angles are small, about one milliradian.

For clarity in FIG. 3 many practical details have been omitted. Obviously shafts 37 and 38 must be connected to a frame or carrier which then supports the entire assembly on some camera system mount. This frame then also supports image receiver counterweights, scan motion motors, control electronics, and other fixed components. The counterweight is needed to keep the scanning motion from being transmitted to the camera system mount and producing unwanted motions or vibrations. Reference is made to U.S. Pat. No. 4,815,819 for general support structure.

FIG. 3 shows the image receiver 34 or camera as a single unit. This is advantageous if the scanning apparatus must be adapted to a wide variety of cameras. However, there is a weight penalty to counterbalance the entire camera. To minimize the weight, the camera may be split in a variety of fashions into a fixed portion and a moving portion. A film camera may be split into the magazine and film drive means in the fixed portion and the lens, the film gate, and the pull down mechanism in the moving portion. Similarly, a video camera may be split into the electronics package in the fixed portion and the lens, the prism optics, and the image chips in the moving portion.

Another splitting technique uses a flexible image conduit to join a fixed camera with a moving lens. This technique is quite adaptable to film or video cameras and provides a minimum moving weight without any camera modifications.

Figure 6A:
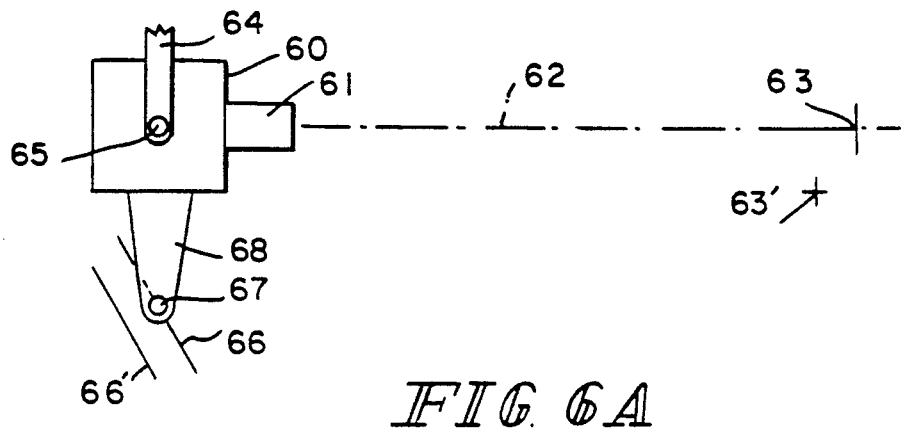
FIGS. 6a and 6b are schematic side and front views respectfully for an alternative embodiment of an image receiver moving along an arcuate scanning path.
Figure 6B:
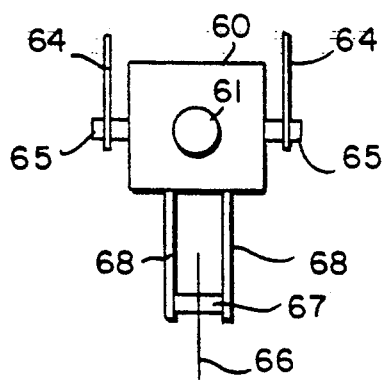

An alternative to the rail system of FIG. 3 is illustrated in FIGS. 6a and 6b. An image receiver or camera 60 includes a lens 61 and an optical path 62 which passes through the convergence point 63. The image receiver 60 moves on fixed rail 64 with bearing 65 and moves on the rotatable rail 66 with bearing 67 and connecting linkage 68. As with FIG. 3, the support structure for the rails 64 and 66, the rotating apparatus for rail 66, and the driver for moving the image receiver along the rails are not showing for clarity. The image receiver 60 is moved along the rails and to producing scanning motion as illustrated in FIG. 2 about the convergence point 63 as approximated by rail 64. The angle of the image receiver 60 is changed by the camera pivoting about the bearing 65 as forced by the rail 66, bearing 67, linkage 68 and the scanning motion. As in the U.S. Pat. No. 4,815,819, the image receiver 60 pivots about point 65 which is a focul point of the lens system.

The approximation that the different positions along the arch are equidistant from the convergence point 63 holds for small changes in the angle is the optical axis 62 which is preferrable one milliradian. At one milliradian, the distant between the image receiver 60 and the ideal convergent point 63 changes 0.5 parts per million (ppm) and the ideal convergent point moves 0.5 ppm. These errors are much smaller than the best media resolution of 100 ppm and much smaller than the resolution of television which is approximately 5,000 ppm.

The angle of rail 66 may be adjusted to change the position of the convergent point 63 and define a new scanning path having views equally distant from the convergent point. This is illustrated in FIG. 6a with rails 66' producing a convergent point of 63'.

FIG. 4 shows scanning apparatus which performs optical path manipulation for a fixed image receiver 40. Optical path manipulation may be accomplished by reflection or refraction. Image receiver 40 is aimed at convergence point 41 via nominal optical path 42 obtained with the mirrors 43 and 44 in positions B and B'. The scanning is accomplished by rotating the mirrors cyclically between extreme positions A, A', C and C'. The mirrors are rotated so that the resulting optical paths always go through the convergence point 41.

Functionally, mirror 43 produces the required scan while mirror 44 corrects for the resulting optical path angle to maintain the length of the optical path between the image receiver 40 and the convergence point 41 substantially fix and aim the optical path at the convergence point 41.

Still another embodiment incorporates a rotating optical cube (not shown) to produce the scan and a mirror or pair of mirrors to aim the optical path at the convergence point. The rotating optical cube refracts the optical path twice to produce an offset as a function of the rotation angle. The optical paths on each side of the cube are parallel. A mirror is then required to aim the optical path at the convergence point. A second mirror may be required.

Computer image creation techniques to perform the present method using the description of a scene, the position of the convergence point, the lens operation, and the position of the observer including the scanning motion to artificially create scanning images, as illustrated in FIG. 8. Obviously, the observer angle is always such that the observer is looking through the convergence point in the scene. Image blurring as a result of the scanning and other motions is a desirable feature in the computer rendering programs. The image receiver is then the memory allocated for storing the created image as a function of the scene and the position and angle of the observer.

Figure 5:
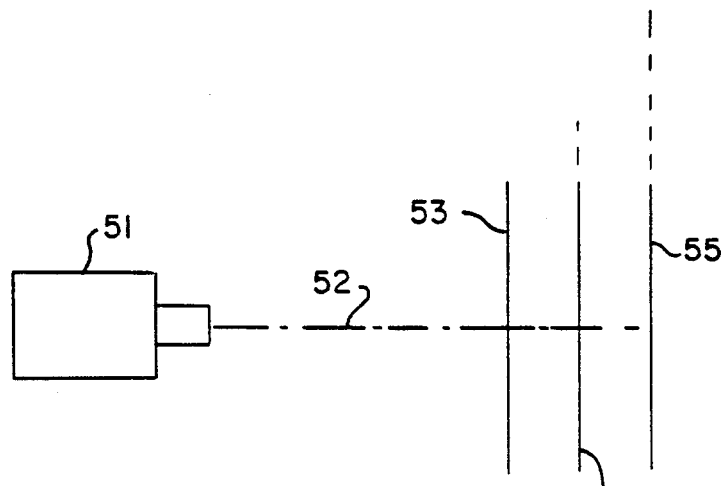
FIG. 5 is a schematically view of the scanning apparatus for scanning by motion control techniques.

FIG. 5 schematically shows scanning synthesized by object motion control techniques. Image receiver 51 records the image about the nominal optical path as presented by artwork 53, 54 and 55. Nominally, the artwork is cel art located perpendicular to the optical axis 52. Artwork on cel 54 appears through clear areas in cel 53 and, similarly artwork on background 55 appears through clear areas in both cels 53 and 54. Cel 54 is representative of possible multiple middle cels.

Cel 53 has the foreground art. The convergence point in this technique is located at cel 53 or somewhat between cel 53 and the image receiver 51. The scanning is then created by motion of the cels and the background as if the camera where doing the scanning with the approximation that the artwork need not be tilted since the angle is so small that it may be neglected. Since the artwork design has an inherent concept of distance between the layers as indicated by perspective and the relative sizes of features, then the synthetic scanning motion is a function of the apparent distance from the image receiver to the convergence point and the apparent distance from the convergence point to the position of the artwork as well as the synthesized scan position.

This may be clarified by supposing that the artwork on cel 53 is apparently 10 feet from the viewer and that the convergence point is in the plane of that artwork. Further suppose that the artwork on cel 54 represents that which is 20 feet from the viewer. Then the scanning motion does not produce any motion of cel 53. However, the scanning motion requires an additional motion in cel 54 equal to the scanning motion to be synthesized because the apparent distance between the viewer and the first artwork is 10 feet and the apparent distance from the first artwork to the second artwork, cel 54, is another 10 feet. Similarly, the scanning motion requires an additional motion in background 55 larger than the scanning motion to be synthesized. The relative extent of motion of the cels 54 and 55 are schematically shown by dotted lines.

Figure 7:
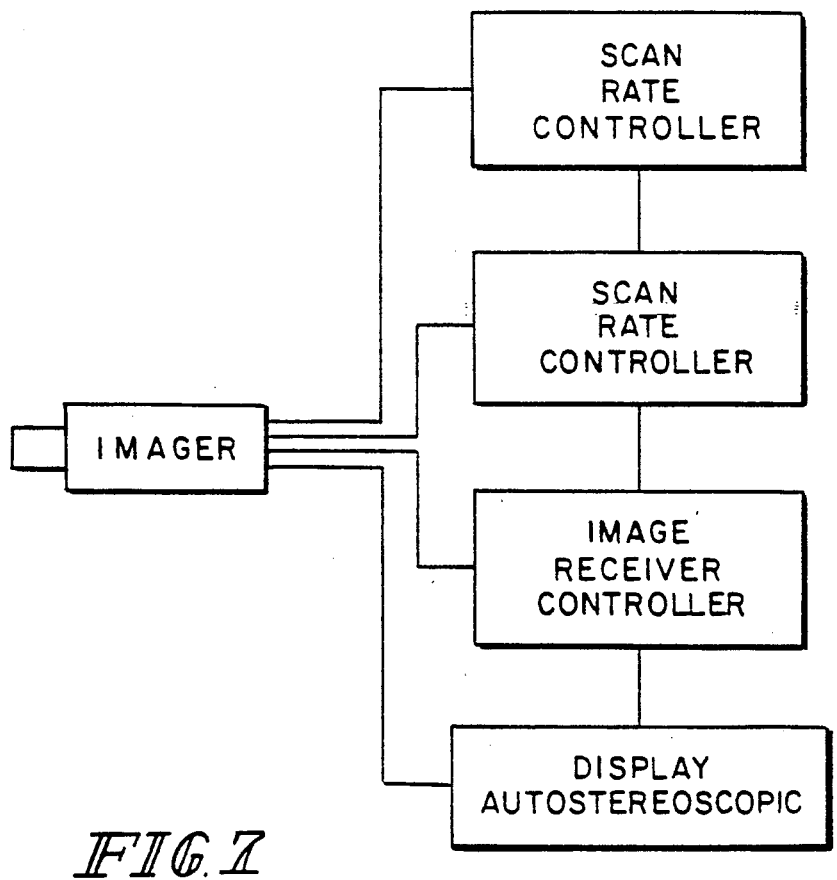
FIG. 7 is a block diagram of a controller according to the present invention.

A controller as illustrated in FIG. 7 includes a scan rate controller, a scan path controller, and an image receiver controller. A scan rate controller controls the rate at which the image receiver and scene move relative to each other. The scan path controller controls the scanning path and is used to adjust the path to define different convergent points. The image receiver controller controls the image receiver and defines the exposure rate as well as the frequency of actuation to determine the various views along the scanning path.

The use of separate controllers allows the scan rate to be independent of the image receiver recording rate. Although in certain circumstances, sychronization may be required. The prior art requires the recording of whole images of two image receivers. Thus, what would be equivalent to the scanning rate must be intimately related to what would be equivalent to the image recording rate. With the ability of the present method and apparatus to control the scanning rate independently of the image recording frequency rate, the scanning rate may be altered to further stabilize the image.

As previously described in U.S. Pat. No. 4,815,819 and the background of the invention, the disparity between a pair of cameras require an adjustment for each scene. The disparity is adjusted in the present single image receiver technique by adjusting the extent of motion along the arc. Thus, it is independent of the specific image receiver and be readily adjusted.

Other artificial techniques for recording images are manually produced drawings and rotoscope aided manually produced drawings. These drawings are produced in a fixed medium and individually recorded by a fixed image receiver to produce the desired affect of scanning according to the principles of the present application.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of recording images for a time sequence autosteroscopic display of a scene, comprising:
choosing a convergence point; and
recording, using a single image receiver, a plurality of scanning images, greater than two per scanning cycle for a plurality of scanning cycles, as viewed along an optical axis substantially intersecting said convergent point and along a scanning path which is approximately a constant optical distance from said convergence point.

2. A method according to claim 1, wherein said path is an arc centered on said convergence point.

3. A method according to claim 2, including defining said are by rails tangent to said arc; and including moving said image receiver on said rails.

4. A method according to claim 1, wherein said recording includes fixing said image receiver; optically manipulating an optical path between said image receiver and said convergence point to provide said plurality of scanning images along said scanning path; and recording said plurality of scanning images.

5. A method according to claim 1, wherein said recording includes computer generating said plurality of scanning images and storing them.

6. A method according to claim 1, wherein said recording includes producing each of said plurality of scanning images in an individual fixed medium and subsequently optically recording said fixed mediums.

7. A method according to claim 1, wherein said recording includes fixing said image receiver; moving objects in said scene except at said convergence point to produce said plurality of scanning images; and recording said plurality of scanning images.

8. A method according to claim 7, wherein said scene includes a plurality of objects fixed in a plurality of parallel planes and said objects in said planes except at said convergence point are moved at an appropriate rate transverse to said optical axis to create said plurality of scanning images.

9. A method according to claim 1, wherein said scanning path is a line segment sufficiently short that all views along said line segment are substantially optically equidistant from said convergence point.

10. A method according to claim 9, wherein recording includes moving said image receiver along said scanning path and simultaneously rotating said image receiver for maintaining said object at said convergence point substantially motionless; and recording said plurality of scanning images.

11. A method according to claim 1, wherein said recording includes moving said image receiver and said scene relative to each other along said scanning path and recording said plurality of scanning images.

12. A method according to claim 11, including setting exposure time of said image receiver sufficiently long to produce blurring of objects in said scene not at said convergence point.

13. A method according to claim 11, wherein the frequency of recording said images is independent of rate of movement along said scanning path.

14. A method according to claim 11, wherein the rate of movement varies along said scanning path.

15. A method according to claim 1, wherein said scanning images are recorded such that motion of objects in said scene when displayed is within visio-psychological memory rate range.

16. A method according to claim 15, wherein said rate is in the range of 2 to 15 cycles per second.

17. An image recording medium containing a plurality of images for sequential display recorded by the method comprising:
choosing a convergence point; and
recording, on a recording medium using a single image receiver, a plurality of scanning images, greater than two per scanning cycle for a plurality of scanning cycles, as viewed along an optical axis substantially intersecting said convergent point and along a scanning path which is approximately a constant optical distance from said convergence point.

18. An image recording medium according to claim 17, wherein said images are recorded such that motion of objects in said scene when displayed is within visio-psychological memory rate range.

19. A method of autostereoscopic display comprising, displaying sequentially and autostereoscopically a plurality of images recorded by the method of:
(a) choosing a convergence point; and
(b) recording, using a single image receiver, a plurality of scanning images, greater than two per scanning cycle for a plurality of scanning cycles, as viewed along an optical axis substantially intersecting said convergent point and along a scanning path which is approximately a constant optical distance from said convergence point.

20. An autostereoscopic recorder comprising:
a single image receiver having an optical axis;
scanning means for substantially continuously moving said optical axis and a scene relative to each other along a scanning path while maintaining said optical axis substantially on said convergence point in said scene; and
means for actuating said receiver to record a plurality of scanning images, greater than two per scanning cycle for a plurality of scanning cycles, along said scanning path so as to have a scanning motion about said convergence point when displayed.

21. An autostereoscopic recorder according to claim 20, wherein said scanning means defines a path in an arc optically equidistant and centered on said convergence point.

22. An autostereoscopic recorder according to claim 21, wherein said scanning means includes rails tangent to said arc and a carriage for moving said receiver along said rails.

23. An autostereoscopic recorder according to claim 20, wherein said scanning means includes optical means for manipulating an optical path between said receiver and said scene to produce said scanning images along said scanning path.

24. An autostereoscopic recorder according to claim 20, wherein said scene includes a plurality of objects and said scanning means moves said objects in said scene except at said convergence point to produce said scanning images in said scanning path.

25. An autostereoscopic recorder according to claim 20, wherein said scanning means defines said scanning path as a line segment sufficiently short that all views along said line segment are substantially optically equidistant from said convergence point.

26. An autostereoscopic recorder according to claim 25, wherein said scanning means rotates said receiver simultaneously with moving it along said scanning path.

27. An autostereoscopic recorder according to claim 20, wherein said actuating means actuates said receiver for an exposure time sufficiently long to produce blurring of objects in said scene not at said convergence point.

28. An autostereoscopic recorder according to claim 20, wherein said actuating means actuates said receiver at a frequency independent of rate of movement of said scanning means.

29. An autostereoscopic recorder according to claim 20, wherein said scanning means moves said optical axis at a variable rate along said scanning path.

30. An autostereoscopic recorder according to claim 20, wherein said actuating means actuating frequency and said rate of movement of said scanning means produces a motion of objects in said scene, when display, within visio-psychological memory rate range.

31. An autostereoscopic recorder according to claim 23, wherein said receiver includes a lens which is movable along said scanning path and is connected to a recorder which is stationary.

32. An autostereoscopic recorder according to claim 20, including means for changing said convergence point.

33. An autostereoscopic recorder according to claim 20, including means for changing said scanning path.

34. A method of recording images for time sequence autostereoscopic display comprising:
choosing a convergence point in a scene; and
recording, using a single image receiver whose optical axis is maintained substantially on said convergence point, a plurality of scanning images, greater than two per scanning cycle for a plurality of scanning cycles, sequentially along a scanning path, said scanning path being sufficiently short and being scanned at a sufficient rate to produce a motion which is within visio-psychological memory rate range when displayed.

35. A method according to claim 34, wherein said recording includes substantially continuously traversing and recording along said scanning path.

36. An image recording medium containing a plurality of images for sequential display recorded by the method comprising:
choosing a convergence point in a scene; and
recording, on a recording medium using a single image receiver whose optical axis is maintained substantially on said convergence point, a plurality of scanning images, greater than two per scanning cycle for a plurality of scanning cycles, sequentially along a scanning path, said scanning path being sufficiently short and being scanned at a sufficient rate to produce a motion which is within visio-psychological memory rate range when displayed.

37. A method of autostereoscopic display comprising, displaying sequentially and autostereoscopically images recorded by the method of:
choosing a convergence point in a scene; and
recording, using a single image receiver whose optical axis is maintained substantially on said convergence point, a plurality of sequential scanning images, greater than two per scanning cycle for a plurality of scanning cycles, sequentially along a scanning path, said scanning path being sufficiently short and being scanned at a sufficient rate to produce a motion which is within visio-psychological memory rate range when displayed.

38. A method of recording images for autosterescopic display comprising:
chosing a convergence point in a scene;
substantially continuously changing the view of a single image receiver of a scene along a scanning path while maintaining an optical axis of said image receiver substantial on said convergence point; and
recording a plurality of scanning images, greater than two distinct views for each cycle for traversing of said scanning path from a first end to a second end and back to said first end of said scanning path.

39. A method according to claim 38, wherein the rate of changing views varies along said scanning path.

40. A method according to claim 38, wherein the rate of changing views varies substantially sinusoidally along said scanning path with a substantially zero rate at said two ends of said scanning path.

41. A method of recording images for autostereoscopic display of a scene, comprising:
choosing a convergence point;
recording, using a single image receiver, a plurality of scanning images, greater than two, as viewed along an optical axis substantially intersecting said convergent point and along a scanning path which is approximately a constant optical distance from said convergence point; and
the focal point of said plurality of recorded images being beyond said convergence point.

42. A method of recording images for autosterescopic display of a scene, comprising:
  choosing a convergence point;
  recording, using a single image receiver, a plurality of scanning images, greater than two, as viewed along an optical axis substantially intersecting said convergent point and along a scanning path which is approximately a constant optical distance from said convergence point; and
  said scanning path including a reference point between its ends at which a viewer would be located and a vertical component with respect to said reference point.

* * * * *